April 3, 1956  T. R. BILL  2,740,535
TRANSMISSION LINE MAINTENANCE DERRICK
Filed Sept. 8, 1953  2 Sheets-Sheet 1

INVENTOR.
Theodore R. Bill
BY Philip A. Frudden
Attorney

April 3, 1956 T. R. BILL 2,740,535
TRANSMISSION LINE MAINTENANCE DERRICK
Filed Sept. 8, 1953 2 Sheets-Sheet 2
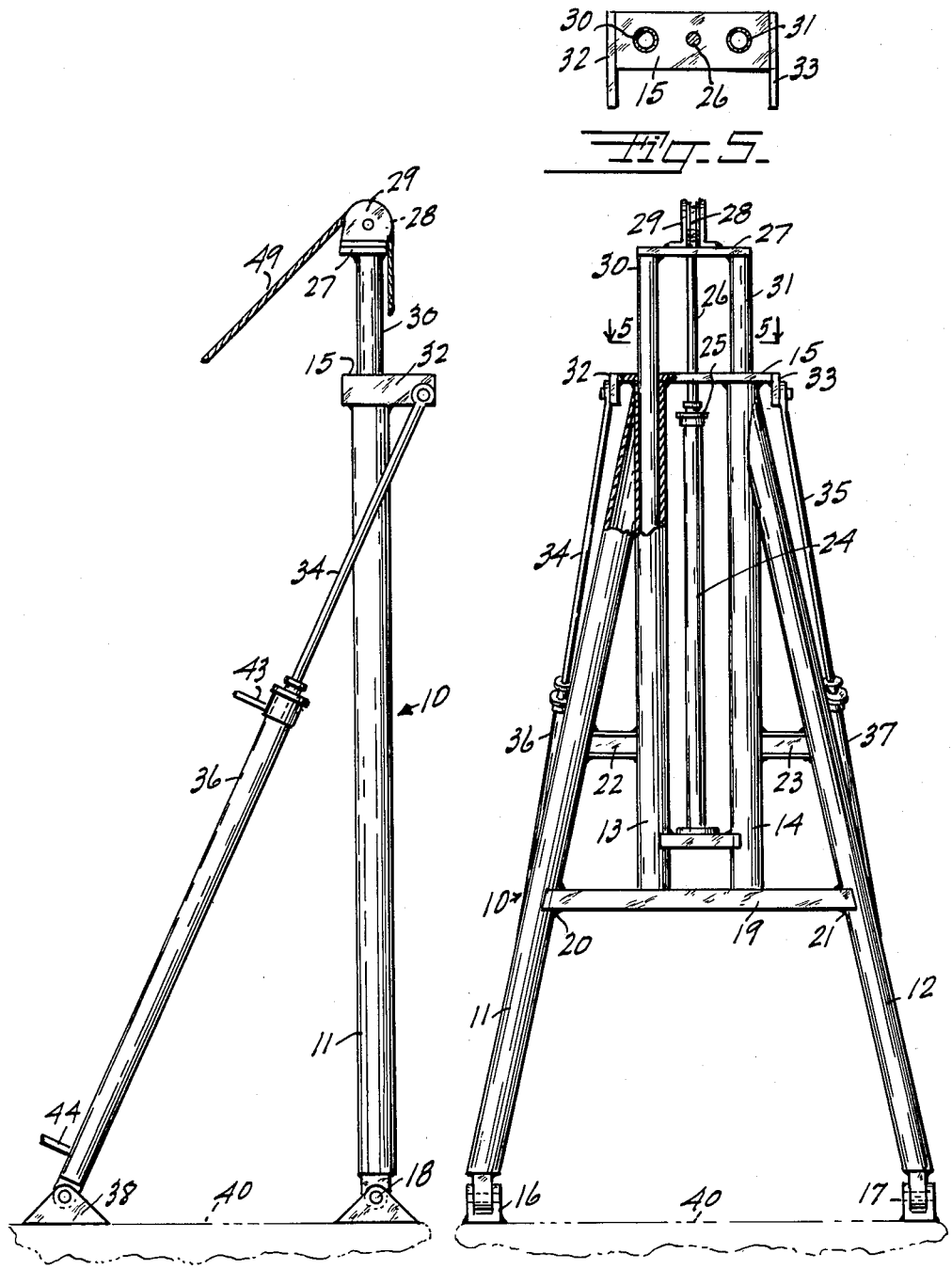
INVENTOR.
Theodore R. Bill
BY
Philip A. Truddell
Attorney

2,740,535

TRANSMISSION LINE MAINTENANCE DERRICK

Theodore R. Bill, San Leandro, Calif.

Application September 8, 1953, Serial No. 378,705

3 Claims. (Cl. 212—8)

This invention relates to improvements in means for handling transmission line elements and materials and has particular reference to a hoist for setting and removing poles, transformers, and other heavy devices and equipment, and provides a derrick which may be mounted on a truck body, frame, or bed, but is of particular merit when mounted on top of a truck body, since it is collapsible to lie flat on top of the body when not in use, and the body provides an initial elevation, which, with the boom extension, permits transformers for example, to be set or removed from poles up to 30 feet in height without having the collapsed derrick project beyond either end of a normal covered truck.

This device provides the most efficient, easiest and most rapid way of setting and removing telephone, telegraph, electric transmission and similar poles, since it can be raised ready for operation in less than a minute, and when the operation is completed, can be again collapsed within a minute, and therefore offer no obstruction along the road, the device collapsing completely within the peripheral limits of the truck top.

When collapsed, no portion of the derrick projects more than a foot above the top of the truck. The derrick is hydraulically raised to operative position and collapsed. In setting a pole, the pole can be supported near the upper end, thus facilitating the operation. Crossarms can be quickly hoisted to the top of the set pole, making it easy and convenient for attachment, and the same applies to transformers.

The objects and advantages of the invention are as follows:

First, to provide a truck with a collapsible derrick to lie substantially flat on top of the truck, and which is quickly and easily raised to operative position.

Second, to provide a derrick as outlined which is hydraulically operated for raising and lowering from and to the collapsed condition.

Third, to provide a derrick as outlined which when in collapsed condition has its extent limited to the peripheral edges of the truck.

Fourth, to provide a derrick as outlined with a hydraulically actuated telescopic extension for increased height when required.

In describing the invention reference will be had to the accompanying drawings, in which:

Fig. 3 is a front elevation of the boom in partly extended position, and with a portion shown in section.

Fig. 4 is a side elevation of Fig. 3.

Fig. 5 is a section taken on line 5—5 of Fig. 3.

Figure 1:
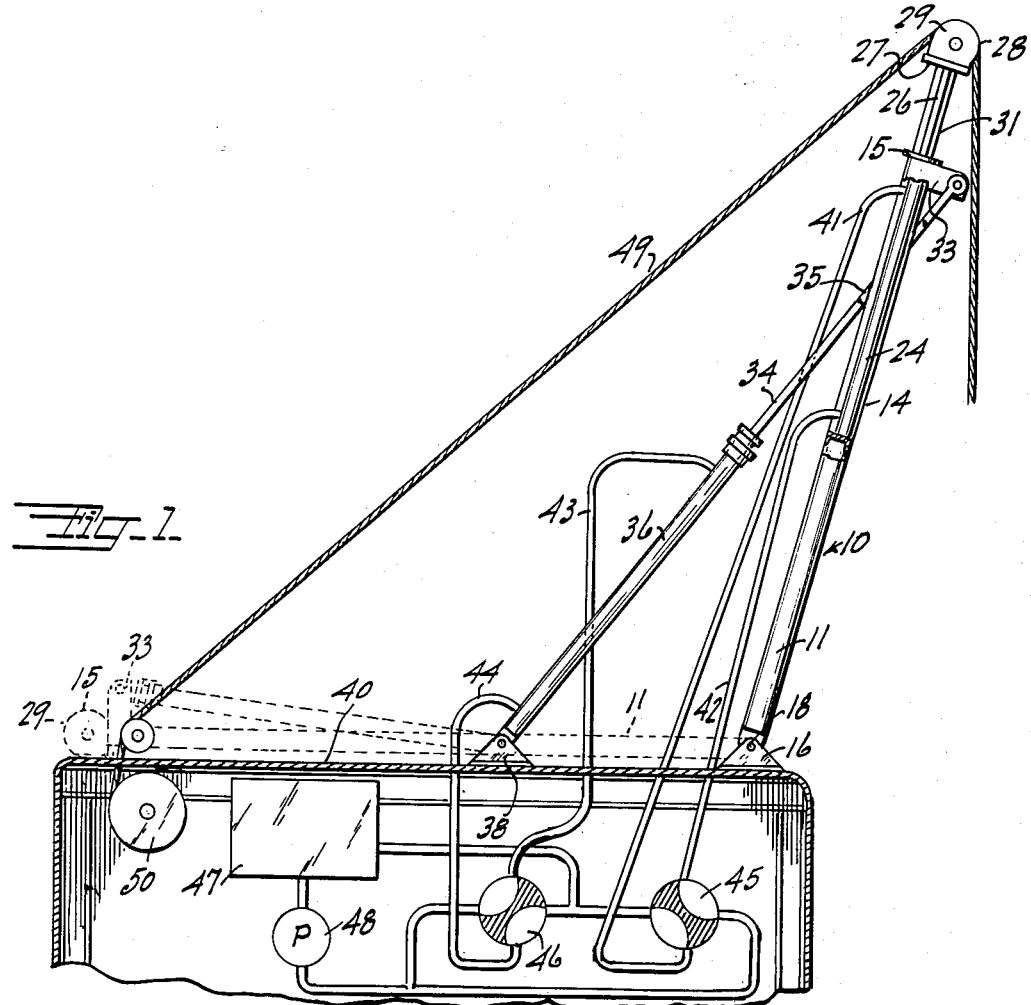
Fig. 1 is a side elevation of the invention as applied to the top of a truck body and shown in raised operative position, and also showing the collapsed position in dotted lines.

The invention includes a boom with a main A frame 10 which is constructed of tubing for the most part, including the tubular legs 11 and 12 which respectively are connected to the guide cylinders 13 and 14 at the upper ends and which legs and guide cylinders terminate at the upper end in a head 15. The lower ends of the legs are hinged in brackets 16 and 17 as indicated at 18. The guide cylinders open through the head and are suitably fixed thereto as by welding. The lower ends of the guide cylinders are fixed to the cross-brace 19 which has its respective ends fixed to the legs as indicated at 20 and 21. Additional cross-braces 22 and 23 are connected between the respective legs and guide cylinders.

A hydraulic jack 24 is mounted between the guide cylinders and is sealed at the lower end and has packing 25 at the upper end for the plunger 26 which slidably operates through the head 15 and has its terminal end fixed to the extension head 27, and a sheave 28 is rotatably mounted in the bearing bracket 29 which is fixedly mounted on the extension head 27. The tubes 30 and 31 are fixed to the extension head 27 and are slidable through the head 15 and into the guide cylinders 13 and 14, providing a rigid telescopic extension for increased height of operation.

Fixed on each end of the head 15 and projecting forwardly are strut arms 32 and 33, to the outer or forward ends of which are pivotally connected the plungers 34 and 35 for the hydraulic jacks 36 and 37, the lower ends of which are pivotally connected to the brackets 38 and 39, the brackets 16, 17, 38 and 39 being fixed to the top 40 of a truck, though they can be mounted on a truck bed or other support if desired. The jacks 36 and 37 comprise the struts for the boom or A-frame, and the forwardly projecting arms 32 and 33 provide angularity for the strut jacks when the device is collapsed as will be noted by the dotted collapsed position shown in Fig. 1.

All three jacks have both, upper and lower fluid connections as indicated at 41 and 42 for the extension jack and at 43 and 44 for the strut jacks, and these respective upper and lower connections are controlled through suitable valves 45 and 46 which in turn are in communication with a fluid supply 47 either direct or through a pump 48.

The cable 49 operates over the sheave 28 and is controlled by a winch 50, the pump and winch being operable by the truck motor (not shown). All control equipment is included in or on the truck so that no outside source of power is required.

Figure 2:
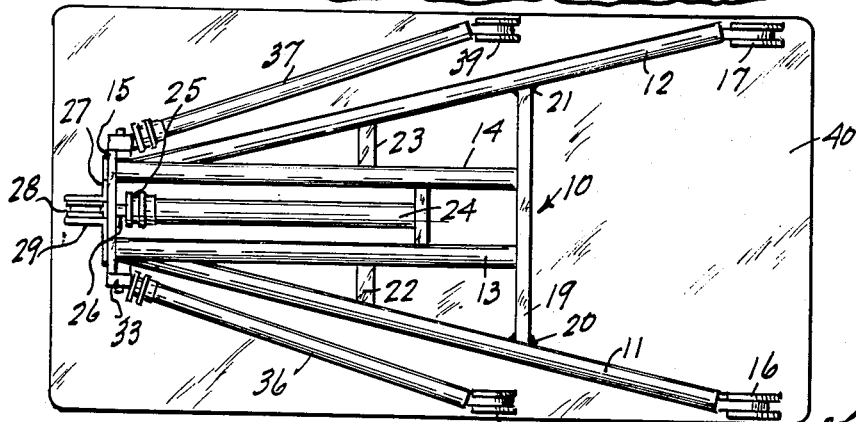
Fig. 2 is a top plan view of the invention in collapsed position, on top of the truck body.

For operation, considering the derrick in collapsed position as shown in Fig. 2 and in dotted lines in Fig. 1, the valve 46 is turned through an angle of 90 degrees, passing the fluid from the supply 47 through the pump and thence through the line 44 to the lower end of the strut jack cylinders, forcing the plungers out and causing the boom to raise to the position shown in Fig. 1, though the boom can be stopped and held in any other position such as the vertical position shown in Fig. 4. When the desired position is reached, the valve 46 is moved to a neutral position at 45 degrees. If a greater height of boom is desired, the valve 45 is turned to the position shown in which case the pump delivers through the line 42 to the lower end of the extension jack, the sheave being advanced as shown in Fig. 3, the load on the sheave being carried by the telescopic guides 30 and 31.

When the operations are completed, the valve 45 is first moved to the opposite position to retract the extension, after which the valve 46 is moved to the position shown to retract the boom to the dotted position shown in Fig. 1, permitting the truck to travel to the next location with no projections greater than the arms 32 which only project about a foot.

Thus, hoisting means is provided which is quickly and easily moved to operative and collapsed positions for decreasing the labor and time, make the labor easier and more convenient, and greatly speed up operation, particularly in the setting and removal of poles. Obviously the invention can be adapted to other trucks for hauling freight, and can be of great advantage in certain lines of freight handling.

I claim:

1. A transmission line maintenance device comprising a truck having a top, a boom pivotally connected at its lower end to the rearward portion of said top, a strut comprising a hydraulic jack having a cylinder and a plunger with the lower end of the cylinder pivotally connected to the top in spaced relation forwardly of said rearward portion, a sheave for the upper end of said boom, a source of fluid under pressure and manual control means therefor for said hydraulic jack, the terminal end of said plunger being pivotally connected to the upper end of said boom, and said boom and strut being retractable and collapsible on top of the truck top within the confines thereof and raised to operative position and lowered to collapsed position through the medium of said strut, a telescopic extension operative from the upper end of said boom and carrying said sheave, and a hydraulic jack mounted on said boom and having a plunger cooperative with said extension for advance and retraction thereof, and manual control means and said source of fluid under pressure for said hydraulic jack mounted on said boom, said boom comprising an A-frame having the respective legs pivotally connected to the respective sides of said top, said telescopic extension comprising spaced sleeves opening at the top of the boom and cylinders slidable in said sleeve and terminating in a common head, with said plunger connected to said common head and the sheave mounted on said common head.

2. Transmission line maintenance equipment comprising a truck having a body including a top, a boom comprising an A-frame having the respective legs hingedly connected to said top adjacent the respective sides at the rearward end, and a head for the upper end of said boom, a strut comprising a hydraulic jack including a cylinder and a plunger with the lower end of the cylinder hingedly connected to said top in spaced relation forwardly of the hinge connections for said boom, and with the terminal end of the plunger connected to said boom for retraction of said boom to rest on said top and for raising said boom to operative position, and a source of fluid under pressure and manual control means therefor for said hydraulic jack, said A-frame including a pair of spaced parallel cylinders opening through said head, a boom extension comprising a pair of plungers slidable operable in said parallel cylinders and having a common head and a sheave mounted on said head, a second hydraulic jack including a cylinder and a plunger with the cylinder mounted between said parallel cylinders and supported by said A-frame and the terminal end of the plunger being connected to said common head for advance and retraction thereof, and manual control means and said source of fluid under pressure for said second hydraulic jack.

3. Transmission line maintenance equipment comprising, a boom including two legs having their respective lower ends hingedly connected to the top of a truck body or the like adjacent the respective sides on the rearward portion of the body, and with the legs convergent toward the upper end and spaced at the upper end and having a head, a cross member between said legs adjacent the lower portion, forming an A-frame, forwardly projecting arms on the respective sides of said head, a hydraulic jack having a cylinder and a plunger, with the lower end of each cylinder hingedly mounted on said top in spaced relation to the hinge mounting for the legs, and with the respective plungers pivotally connected to the respective arms, a source of fluid under pressure and manual control means therefor for said hydraulic jacks, said hydraulic jacks operating as raising and lowering means for said boom and as struts in the raised position, with said boom and hydraulic jacks folding on said top in completely collapsed position within the confines of the sides of said top, a pair of cylinders in spaced parallel relation between said legs and fixed to and opening through said head and having a common head at the lower ends, a plunger slidable in each cylinder and a common head for said plungers, and a sheave mounted on said head, a hydraulic jack supported on said common head at the lower ends and having a plunger fixed to said common head for said plungers and slidably operable through said head for said legs, and manual control means and said source of fluid under pressure for said hydraulic jack supported on said common head, and forming a hydraulically operable extension for said boom for increasing the height thereof.

References Cited in the file of this patent

UNITED STATES PATENTS

| | | |
|---|---|---|
| 1,603,573 | Baker | Oct. 19, 1926 |
| 2,353,655 | Day | July 18, 1944 |
| 2,433,598 | Chadwick Jr. | Dec. 30, 1947 |
| 2,557,192 | Leister | June 19, 1951 |
| 2,595,307 | Selberg | May 6, 1952 |
| 2,611,580 | Troche et al. | Sept. 23, 1952 |
| 2,616,666 | Honey | Nov. 4, 1952 |
| 2,645,360 | Raymond | July 14, 1953 |